July 30, 1935.  L. R. HILL ET AL  2,009,659
CONTROL APPARATUS
Filed June 30, 1933
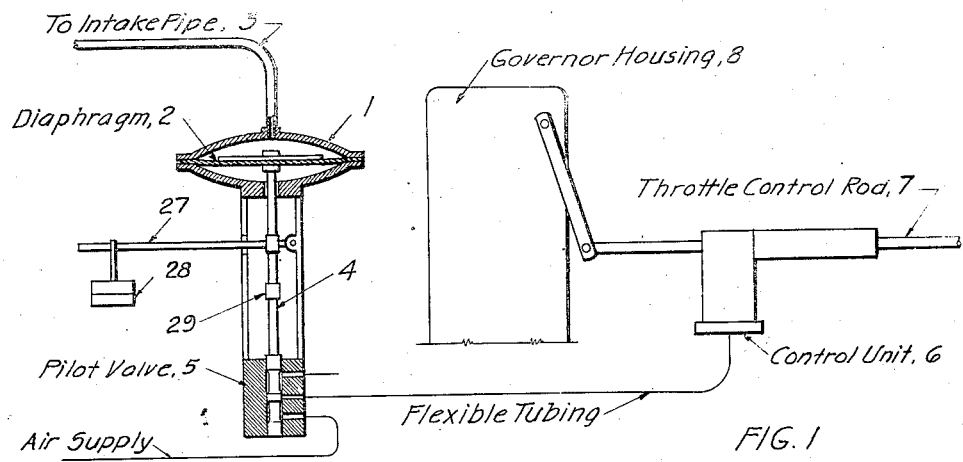
FIG. I
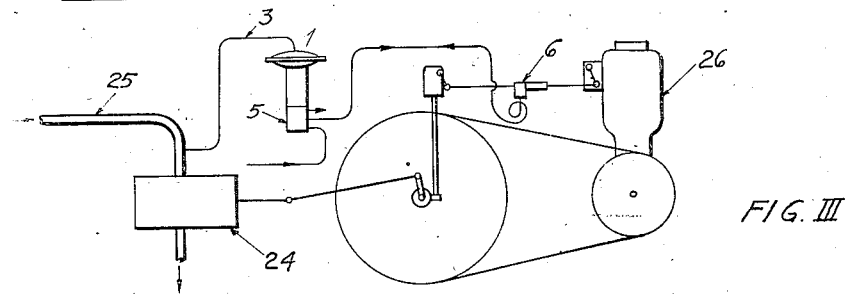
FIG. III
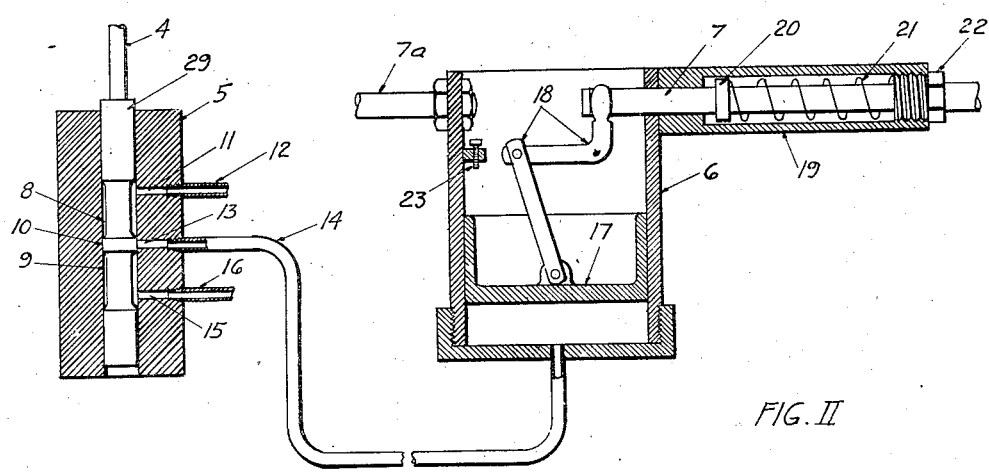
FIG. II
Inventors: L.R. Hill, H.E. Raymond, R.A. Sanders
By His Attorney:

Patented July 30, 1935

2,009,659

UNITED STATES PATENT OFFICE 2,009,659

CONTROL APPARATUS

Lea Roy Hill, Wood River, and Harry Elmer Raymond, Alton, and Ray Heeren Sanders, Wood River, Ill., assignors to Shell Development Company, San Francisco, Calif., a corporation of Delaware Application June 30, 1933, Serial No. 678,408

2 Claims. (Cl. 230—3)

This invention particularly relates to apparatus in which a vacuum or pressure in a line is employed to control means by which an opening or closing of a valve is effected.

In the operation of gas compressors, it is important in some cases to maintain a constant vacuum in the compressor suction line. In order to effect this it is necessary for an operator to adjust manually the speed of the compressor according to whether the vacuum in the suction line is greater or less than the desired vacuum.

It is an object of this invention to eliminate the need for manual regulation of the compressor speed in order to maintain a constant vacuum in the compressor suction line. It is another object of this invention to devise suitable automatic apparatus for regulating the speed of the compressors to maintain a desired constant vacuum in the compressor or suction line.

I have found that the disadvantage of manual control can be eliminated by utilizing means controlled by the vacuum existing in the suction line to effect a lengthening or shortening of the linkage between the speed governor and the throttle valve of the compressor driving apparatus.

This is carried out by inserting a unit in the line of the linkage, which, in response to a pressure exerted lengthens or shortens the linkage so as to bring about a change in the compressor speed. The application of the pressure to the unit is controlled by the vacuum in the intake line.

The further features of the invention will be more readily understood from the following description throughout which reference is made to the accompanying drawing.

Figure I is a view in elevation showing the general arrangement of control mechanism.

Figure II is an elevation showing the valve and control unit in detail.

Figure III is a diagrammatic view showing the control as used in conjunction with a compressor and driving motor.

Referring to Figure I numeral (1) represents a casing having a flexible diaphragm (2) dividing the casing into two sections one of said sections being air-tight. To this air-tight section is connected a conduit (3) which terminates in the suction line of a compressor as will hereinafter be explained. To the center of the diaphragm (2) is attached a rod (4) extending downward to the plunger of a two way valve (5). One port of the valve (5) is connected to a control unit (6) which may be situated in the line of a throttle rod (7) leading to a speed governor (8).

Referring to Figure II which shows in more detail the valve (5) and the control unit (6) like numerals denote parts described with reference to Figure I. The plunger (29) of the valve (5) has two annular grooves (8) and (9) separated by a shoulder (10). At the upper end of the valve body is an exhaust port (11) which may vent to the atmosphere or by way of a pipe (12) to a suitable receiver. At approximately the mid-point of the valve body is a second port (13) which is connected by flexible piping (14) to the control unit (6). At the lower end of the valve body is an inlet port (15) which is connected by piping (16) to a source of fluid under pressure. The control unit (6) comprises a cylinder having a piston (17) fitted therein. The piston is connected by linkage (18) to one section of the throttle control rod (7), leading to the throttle of the motor driving the compressor. A second section of the throttle control rod (7a) is connected at one end to the body of the control unit, the other end being connected to a governor as shown in Figure I. The section (7) of the throttle control rod passes through a sleeve (19) forming a portion of the control unit body. Mounted upon the throttle rod is a collar (20) and a coil spring (21) which abuts at one end against the collar (20). The other end of the spring is in contact with a tension adjusting nut (22) attached to the body of the unit. An adjustable piston stop (23) may be attached to the cylinder wall. The closed end of the cylinder is connected to the flexible tubing (14).

In Figure III which is a general view showing the relation of the control apparatus to existing apparatus, (24) represents a compressor having a suction line (25) and (26) represents a gasoline motor driving the compressor. The remaining parts have been described in connection with reference to Figures I and II. The operation of the control is as follows:

By means of line (3) the vacuum existing in the suction line (25) of the compressor (24) acts upon the diaphragm (2) in the casing (1). Movement of the diaphragm through rod (4) results in movement of the valve plunger (29). In case the vacuum in the suction line (25) is higher than desired, movement of diaphragm (2) will be upward causing the plunger (29) to rise so that by means of lower groove (9) the fluid under pressure, for instance air, will pass from line (16) through line (14) into the cylinder head of the control unit forcing the piston (17) upward, so that by linkage (18) the throttle rod is lengthened resulting in a slowing down of the motor driving the compressor.

On the other hand if the vacuum in the suction line (25) is less than normal the diaphragm will move downward causing the groove (8) to connect the line (14) to the atmosphere, so that under the influence of spring (21) the throttle rod will be shortened as the air pressure on the piston head will be reduced. By the shortening of the rod the speed of the motor and the compressor are increased.

By means of lever arm (27) and weight (28) shown in Figure I, the control may be set to operate about a predetermined degree of vacuum in line (25). Also by means of an adjusting sleeve (29) shown in Figure I the rod (4) may be made of a desired length.

Instead of using compressed air to bring about a lengthening of the throttle rod, I may use liquids such as oil, glycerine or water. If such are used the pipe (12) should lead to a suitable receiver. Means for returning the liquid to the pressure system could be devised as will be readily understood by those skilled in the art.

I claim as my invention:

1. In combination, a compressor, an intake manifold connected thereto, a diaphragm-containing unit, a pipe connecting said manifold to one side of the diaphragm of said diaphragm-containing unit, a valve operated by said diaphragm, a line connecting one side of said valve to a pressure vessel, a line connecting the other side of said valve to a longitudinally extendible rod, and a motor driving said compressor controlled by said rod.

2. Control apparatus for a motor-driven compressor comprising, a diaphragm-containing unit, a pipe connecting said unit to the intake manifold of a compressor, a two-way valve connected to and operated by said diaphragm, a line connecting a first port of said valve to a source of fluid under pressure, a longitudinally extendible rod controlling the motor driving said compressor, a line connecting a second port of said valve to said extendible rod and a line connecting a third port of said valve to the atmosphere.

LEA ROY HILL.
HARRY ELMER RAYMOND.
RAY HEEREN SANDERS.